United States Patent
Hiratani et al.

(10) Patent No.: US 11,613,661 B2
(45) Date of Patent: Mar. 28, 2023

(54) CURABLE RESIN COMPOSITION AND MANUFACTURING METHOD OF THREE-DIMENSIONAL OBJECT USING THE SAME

(71) Applicant: CANON KABUSHIKI KAISHA, Tokyo (JP)

(72) Inventors: Takayuki Hiratani, Tokyo (JP); Kyohei Wada, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 815 days.

(21) Appl. No.: 16/377,610

(22) Filed: Apr. 8, 2019

(65) Prior Publication Data
US 2019/0315979 A1  Oct. 17, 2019

(30) Foreign Application Priority Data

Apr. 16, 2018 (JP) .............................. JP2018-078104
Mar. 26, 2019 (JP) .............................. JP2019-057991

(51) Int. Cl.

| | | |
|---|---|---|
| C08F 2/46 | (2006.01) | |
| C08F 2/50 | (2006.01) | |
| C08G 61/04 | (2006.01) | |
| C09D 11/102 | (2014.01) | |
| C09D 11/101 | (2014.01) | |
| B29C 64/291 | (2017.01) | |
| B33Y 10/00 | (2015.01) | |
| B33Y 70/00 | (2020.01) | |
| B29K 71/00 | (2006.01) | |
| B29K 33/00 | (2006.01) | |
| B29K 9/00 | (2006.01) | |
| B29K 63/00 | (2006.01) | |

(52) U.S. Cl.
CPC .......... *C09D 11/102* (2013.01); *B29C 64/291* (2017.08); *B33Y 10/00* (2014.12); *B33Y 70/00* (2014.12); *C09D 11/101* (2013.01); *B29K 2009/00* (2013.01); *B29K 2033/12* (2013.01); *B29K 2063/00* (2013.01); *B29K 2071/00* (2013.01)

(58) Field of Classification Search
CPC ... C09D 11/102; C09D 11/106; C09D 11/101; B33Y 70/00; B33Y 10/00; B29C 64/291; B29K 2033/12; B29K 2009/00; B29K 2063/00; B29K 2071/00

USPC ................... 522/7, 6, 189, 184, 71, 1; 520/1
See application file for complete search history.

(56) References Cited

U.S. PATENT DOCUMENTS

| | | | |
|---|---|---|---|
| 8,980,971 B2 | 3/2015 | Ueda et al. | |
| 2005/0171255 A1* | 8/2005 | Yamamura | ............ C08F 287/00 524/124 |
| 2010/0015408 A1* | 1/2010 | Fong | ...................... G09B 23/28 428/195.1 |
| 2010/0227941 A1 | 9/2010 | Ueda et al. | |

FOREIGN PATENT DOCUMENTS

| | | |
|---|---|---|
| JP | 60-247515 A | 12/1985 |
| JP | 2008-260787 A | 10/2008 |
| JP | 2008-260812 A | 10/2008 |
| JP | 2009-513764 A | 4/2009 |
| JP | 2011-213791 A | 10/2011 |
| JP | 2013-23574 A | 2/2013 |
| JP | 2013-166893 A | 8/2013 |
| WO | 2007/048819 A1 | 5/2007 |
| WO | WO-2017179536 A1 * 10/2017 ............. B32B 15/04 |  |

OTHER PUBLICATIONS

Okamoto, WO 2017/179536 Machine Translation, Oct. 19, 2017 (Year: 2017).*
Wada et al., U.S. Appl. No. 16/211,419, filed Dec. 6, 2018.
Notice of Reasons for Refusal in Japanese Application No. 2019-057991 (Feb. 2023).

* cited by examiner

*Primary Examiner* — Jessica Whiteley
(74) *Attorney, Agent, or Firm* — Venable LLP (57) ABSTRACT

A curable resin composition includes: an oxetane compound (A) having one oxetanyl group as a cationic polymerizable reactive group and at least one hydroxyl group; a cationic polymerizable compound (B) which is a cationic polymerizable compound other than the oxetane compound (A) and has two or more cationic polymerization reactive groups; a rubber particle (C); and a curing agent (D), wherein the oxetane compound (A) is contained at 30 parts by mass or more and 60 parts by mass or less, based on 100 parts by mass of total mass of the oxetane compound (A) and the cationic polymerizable compound (B), and the rubber particle (C) has a group capable of reacting with the oxetane compound (A) or the cationic polymerizable compound (B) on a surface of the rubber particle (C).

16 Claims, 2 Drawing Sheets

CURABLE RESIN COMPOSITION AND MANUFACTURING METHOD OF THREE-DIMENSIONAL OBJECT USING THE SAME

BACKGROUND OF THE INVENTION

Field of the Invention

The present invention relates to a curable resin composition and a manufacturing method of a three-dimensional object using the same.

Description of the Related Art

An optical three-dimensional shaping method in which a process of selectively irradiating a photocurable resin composition with light so that a predetermined three-dimensional shape is reproduced, to form a cured resin layer, is repeated, thereby integrally laminating the cured resin layers to form a three-dimensional shaped object composed of the cured resin layers, is known in the art (Japanese Patent Application Laid-Open No. S60-247515). A representative example of the optical three-dimensional shaping method will be described below.

First, a liquid surface of a photocurable resin composition contained in a container is selectively irradiated with light such as an ultraviolet laser, so that a section pattern of a three-dimensional shaped object to be produced is drawn, thereby forming a cured resin layer having a predetermined section pattern. Next, a photocurable resin composition is supplied on the cured resin layer for one layer fraction and the liquid surface thereof is irradiated with light for the next section pattern, thereby integrally forming a new cured resin layer by lamination on the previously formed cured resin layer so that the new cured resin layer is continuous with the previously formed cured resin layer. As such, by repeating the process of laminating the section pattern at the predetermined number of times, a predetermined three-dimensional shaped object is obtained. Even in the case that the shape of the three-dimensional shaped object to be desired is complicated, the optical three-dimensional shaping method can produce the three-dimensional shaped object easily and within a short time.

Toughness to prevent a three-dimensional shaped object from being broken when the three-dimensional shaped object is impacted, together with thermal resistance to allow the three-dimensional shaped object to have a high thermal deformation temperature is required for the photocurable resin composition forming the three-dimensional shaped object. Japanese Patent Application Laid-Open No. 2013-23574 discloses using a photocurable resin composition including a cationic polymerizable compound, a radical polymerizable compound, and rubber particles. In addition, Japanese Patent Application Laid-Open No. 2013-23574 also discloses using a dioxetane compound having two oxetanyl groups and an aromatic ring, a monofunctional oxetane compound having one oxetanyl group, and an epoxy compound having two epoxy groups, as a cationic polymerizable compound. Thus, obtaining a three-dimensional shaped object having thermal resistance and excellent toughness is disclosed.

However, the three-dimensional shaped object of Japanese Patent Application Laid-Open No. 2013-23574 has a good result for practical toughness (snap-fit property), but strength when the three-dimensional shaped object is impacted is not sufficient, and compatibility between thermal resistance and toughness is insufficient.

SUMMARY OF THE INVENTION

An object of the present invention is to provide a curable resin composition having toughness to prevent a cured product of the curable resin composition from being broken when the cured product is impacted, together with thermal resistance to allow the cured product to have a high thermal deformation temperature.

The curable resin composition of the present invention includes:
an oxetane compound (A) having one oxetanyl group as a cationic polymerizable reactive group and at least one hydroxyl group;
a cationic polymerizable compound (B) which is a cationic polymerizable compound other than the oxetane compound (A) and has two or more cationic polymerization reactive groups;
a rubber particle (C); and
a curing agent (D),
wherein the oxetane compound (A) is contained at 30 parts by mass or more and 60 parts by mass or less, based on 100 parts by mass of total mass of the oxetane compound (A) and the cationic polymerizable compound (B), and
the rubber particle (C) has a group capable of reacting with the oxetane compound (A) or the cationic polymerizable compound (B) on a surface of the rubber particle (C).

According to the present invention, a cured product having both excellent thermal resistance and toughness can be formed, and a curable resin composition which is preferred for three-dimensional shaping can be provided.

Further features of the present invention will become apparent from the following description of exemplary embodiments with reference to the attached drawings.

DESCRIPTION OF THE EMBODIMENTS

Hereinafter, an exemplary embodiment of the present invention will be described. In addition, the exemplary embodiment described below is only one of the exemplary embodiments of the present invention, and the present invention is not limited to the exemplary embodiments. Main features of the present invention is that a curable resin composition of the present invention includes a certain amount of an oxetane compound (A) having one oxetanyl group as a cationic polymerizable reactive group and at least one hydroxyl group. Thus, the oxetane compound (A) will be described first, and then a cationic polymerizable compound (B), a rubber particle (C), and a curing agent (D) other than the oxetane compound (A) will be described continuously.

<Oxetane Compound (A)>

Since the oxetane compound (A) according to the present invention has one oxetanyl group as a cationic polymeriz- able reactive group, the oxetane compound (A) is polymerized by an action of the curing agent (D). In addition, the oxetane compound (A) has at least one hydroxyl group. The hydroxyl group is known to act as a chain transfer agent in a cation ring-opening polymerization reaction of a cationic polymerizable compound which is initiated by the curing agent (D) described below. Accordingly, in the oxetane compound (A), one oxetane ring participates in the ring-opening polymerization, and also some hydroxyl groups are chain-transferred to a polymerization active end, thereby contributing to acceleration of a polymerization reaction and crosslinking. In addition, a hydroxyl group which remains without participating in the chain transfer contributes to formation of a hydrogen bond (sacrificial bond) in a cured product, which contributes to improvement of thermal resistance and toughness of the cured product.

Though the number of hydroxyl groups in the oxetane compound (A) is not particularly limited, the number of hydroxyl groups is 1 or more and 4 or less, preferably 1 or more and 3 or less, and more preferably 1 or more and 2 or less. Within the range of the number of hydroxyl groups, an excessive increase of crosslink density is suppressed, and at the same time, an effect of forming a sacrificial bond of the remaining hydroxyl group is exhibited, thereby allowing compatibility between high thermal resistance and toughness.

The oxetane compound (A) having one hydroxyl group may include, preferably, a compound represented by General Formula (1) or General Formula (2), but is not limited thereto.

General Formula (1)

General Formula (2)

In General Formula (1) or General Formula (2), $R_1$ and $R_3$ denote a hydrogen atom, or a straight chain or branched chain alkyl group having 1 or more and 6 or less carbon atoms. $R_2$ and $R_4$ denote a single bond or a straight chain or branched chain alkylene group having 1 or more and 6 or less carbon atoms. $R_5$ denotes a straight chain or branched chain alkylene group having 1 or more and 10 or less carbon atoms (when an aromatic ring is contained, carbon atoms other than those constituting the aromatic ring) which may contain an ether bond or an aromatic ring.

An example of the compound represented by General Formula (1) may include, specifically, 3-(hydroxymethyl)oxetane, 3-methyl-3-(hydroxymethyl)oxetane, 3-ethyl-3-(hydroxymethyl)oxetane, or the like.

In addition, an example of the compound represented by General Formula (2) may include, specifically, the following compounds:

A-1

A-2

A-3

A-4

A-5

A-6

A-7

In addition, an example of the oxetane compound (A) having two hydroxyl groups may include, preferably, compounds represented by General Formula (3), General Formula (4), or General Formula (5).

General Formula (3)

General Formula (4)

General Formula (5)

In General Formula (3), General Formula (4), and General Formula (5), $R_6$ to $R_9$, $R_{12}$, and $R_{13}$ denote a single bond or a straight chain or branched chain alkylene group having 1 or more and 6 or less carbon atoms. $R_{10}$, $R_{11}$, and $R_{14}$ independently of one another denote a straight chain or branched chain alkylene group having 1 or more and 10 or less carbon atoms (when an aromatic ring is contained, carbon atoms other than those constituting the aromatic ring) which may contain an ether bond or an aromatic ring.

Among them, 3-methyl-3-(hydroxymethyl)oxetane and 3-ethyl-3-(hydroxymethyl)oxetane, which are the oxetane compound (A) having one hydroxyl group, can be preferably used, from the availability thereof. In addition, these monofunctional oxetane compounds may be used alone or in combination of two or more.

For expression of the effect of the present invention, a content of the oxetane compound (A) is 30 parts by mass or more and 60 parts by mass or less, based on 100 parts by mass of total mass of the oxetane compound (A) and the cationic polymerizable compound (B) described below. The content of the oxetane compound (A) is preferably 32 parts by mass or more and 60 parts by mass or less, and more preferably 35 parts by mass or more and 60 parts by mass or less. Within the range of the content of the oxetane compound (A), the obtained cured product can be compatible between high thermal resistance and toughness.

It is preferred that a molecular weight of the oxetane compound (A) is 5000 or less. Within the range of the molecular weight, viscosity of the oxetane compound (A) is maintained low and the oxetane compound (A) effectively acts as a diluent component of the curable resin composition, and thus, the range is preferred in terms of an improved handling property.

<Cationic Polymerizable Compound (B)>

The cationic polymerizable compound (B) is a cationic polymerizable compound other than the oxetane compound (A) and a compound having two or more cationic polymerization reactive groups. The cationic polymerizable reactive group of the present invention may include an epoxy group, a cycloalkeneoxide group, an oxetanyl group, or a cyclic ether group, and a combination of two or more reactive groups may be used. The cationic polymerization reactive group is preferably an epoxy group or an oxetanyl group, from the availability thereof. The number of the cationic polymerization reactive groups is 2 or more and 6 or less, preferably 2 or more and 4 or less, and more preferably 2 or more and 3 or less. When the number of the cationic polymerization reactive groups is 7 or more, crosslink density tends to be increased to cause deterioration of toughness.

It is preferred that the reactive group equivalent of the cationic polymerizable compound (B) is 100 g/eq or more and 450 g/eq or less, preferably 125 g/eq or more and 430 g/eq or less, more preferably 150 g/eq or more and 420 g/eq or less, and still more preferably 150 g/eq or more and 300 g/eq or less. Within the range of the reactive group equivalent, an excessive increase or excessive decrease in crosslinked density of the cured product of the curable resin composition of the present invention may be suppressed, and good thermal resistance and toughness of the curable resin composition can be compatible. In the present invention, the reactive group equivalent refers to a value representing a molecular weight per one cationic reactive group. For example, when the cationic reactive group is an epoxy group, the reactive group equivalent is an epoxy equivalent. The reactive group equivalent may be determined using a known method such as a method of determining an epoxy equivalent of an epoxy resin (JISK7236). When the cationic polymerizable compound (B) is formed of a mixture of two or more cationic polymerizable compounds having different reactive group equivalents, for each compound, a product of the reactive group equivalent of each compound and the content ratio of each compound in the cationic polymerizable compound (B) is calculated, and the products are all added up to obtain a value, which is the reactive group equivalent. For example, when the cationic polymerizable compound (B) is composed of 60% by mass of Compound X having a reactive group equivalent of 200 g/eq and 40% by mass of Compound Y having a reactive group equivalent of 400 g/eq, 200×0.6+400×0.4=280 g/eq is the reactive group equivalent of the cationic polymerizable compound (B).

The compound having an epoxy group may include, specifically, a bisphenol A type epoxy resin, a bisphenol F type epoxy resin, a biphenyl type epoxy resin, a tetramethyl biphenyl type epoxy resin, a naphthalene type epoxy resin, a phenol novolac type epoxy resin, a cresol novolac type epoxy resin, a triphenylmethane type epoxy resin, a tetraphenylethane type epoxy resin, a dicyclopentadiene-phenol addition reaction type epoxy resin, a phenolaralkyl type epoxy resin, a naphtholnovolac type epoxy resin, a naphtholaralkyl type epoxy resin, a naphthol-phenol co-condensation novolac type epoxy resin, a naphthol-cresol co-condensation novolac type epoxy resin, an aromatic hydrocarbon formaldehyde resin modified phenol resin type epoxy resin, a biphenyl modified novolac type epoxy resin, a naphthylene ether type epoxy resin, an epoxidized polybutadiene, or the like. Among them, a bisphenol type epoxy resin may be preferably used, from the availability thereof. Among them, monomers such as bisphenol A diglycidylether or bisphenol F diglycidylether may be preferably used, since the photocurable resin composition has low viscosity.

A specific example of the compound having an oxetanyl group may include dioxetane compounds such as bis[1-ethyl (3-oxetanyl)]methylether, 4,4'-bis[3-ethyl-(3-oxetanyl) methoxymethyl]biphenyl, 1,4-bis(3-ethyl-3-oxetanylmethoxy)methylbenzene, xylylenebisoxetane, bis[ethyl(3-oxetanyl)]methyl carbonate, bis[ethyl(3-oxetanyl)]ethyl adipate, bis[ethyl(3-oxetanyl)]methyl terephthalate, 1,4-cyclohexane bis[ethyl(3-oxetanyl)]methyl carboxylate, bis{4-[ethyl(3-oxetanyl)methoxycarbonylamino]phenyl}methane, and α,ω-bis-{3-[1-ethyl(3-oxetanyl)methoxy]propyl} (polydimethylsiloxane), and polyoxetane compounds such as oligo(glycidyloxetane-co-phenylglycidylether), but is not limited thereto.

The compound having a cycloalkeneoxide group may include, specifically, 3',4'-epoxycyclohexylmethyl-3,4-epoxycyclohexanecarboxylate, bis(3,4-epoxycyclohexylmethyl)ether, or the like.

Outside of that, the compound having a cyclic ether group may include, for example, a compound having a tetrahydrofuran ring or a tetrahydropyran ring, or the like.

The cationic polymerizable compound (B) has two or more epoxy groups as a cationic polymerization reactive group and preferably contains a compound having the reactive group equivalent of 150 g/eq or more and 300 g/eq or less. In addition, the content of the compound is preferably 20% by mass or more and 100% by mass or less in the cationic polymerizable compound (B). Within the range of the content of the compound, compatibility between good thermal resistance and toughness is possible.

<Rubber Particle (C)>

The curable resin composition of the present invention may include the rubber particles (C), thereby significantly improving the toughness of the cured product.

In the present invention, the kind of rubber particles is not particularly limited. For example, butadiene rubber particles, styrene/butadiene copolymerized rubber particles, acrylonitrile/butadiene copolymerized rubber particles, saturated rubber particles which are hydrogen-added or partially hydrogen-added to these diene rubbers, crosslinked butadiene rubber particles, isoprene rubber particles, chloroprene rubber particles, natural rubber particles, silicone rubber particles, ethylene/propylene/diene monomer terpolymerized rubber particles, acryl rubber particles, acryl/silicone composite rubber particles, and the like can be included. These rubber particles may be used alone or in combination or two or more. Among them, at least one kind of particles selected from butadiene rubber particles, crosslinked butadiene rubber particles, styrene/butadiene copolymerized rubber particles, acryl rubber particles, and silicone/acryl composite rubber particles are preferred, in terms of flexibility.

In addition, it is preferred that the rubber particles (C) are the rubber particles having a functional group capable of reacting with the oxetane compound (A) or the cationic polymerizable compound (B) on the surface, so called, the rubber particles having a core-shell structure (core shell type rubber particles), in terms of dispersibility in the curable resin composition. Specifically, a structure in which a core is the above-described rubber particles and at least a portion of the surface is covered with a shell of a resin having a higher glass transition temperature than the rubber particles, for example, a copolymer based on (meth)acrylic acid ester such as methyl methacrylate, a copolymer of (meth)acrylic acid ester such as methyl methacrylate with glycidyl (meth)acrylate, or a copolymer of (meth)acrylic acid ester such as methyl methacrylate, glycidyl (meth)acrylate, and styrene, is preferred. The resin used in the shell may be properly selected, in terms of compatibility or dispersibility with the rubber particles of the core, and a resin having a group capable of reacting with the oxetane compound (A) or the cationic polymerizable compound (B) is preferred. A specific example of the functional group capable of reacting with the oxetane compound (A) or the cationic polymerizable compound (B) may include a glycidyl group, or an oxetanyl group, a hydroxyl group, or a carboxyl group. As a mass ratio of the core and the shell, preferably 1 part by mass or more and 200 parts by mass or less, and more preferably 2 parts by mass or more and 180 parts by mass or less of the shell of a resin is provided on the surface of the rubber particles, based on 100 parts by mass of the core. Within the range of the mass ratio of the core (rubber particles) and shell (resin covering the surface of the core), an effect of improving good toughness tends to be obtained by including the rubber particles (C).

It is preferred that the rubber particles (C) have an average particle diameter of 20 nm or more and 750 nm or less. When the average particle diameter is less than 20 nm, increased viscosity involved in addition of the rubber particles into the curable resin composition or interaction between the rubber particles involved in an increased specific surface area tends to cause a decrease of thermal resistance or a decrease of toughness. In addition, when the average particle diameter is more than 750 nm, dispersibility in the curable resin composition is not sufficient and it tends to be difficult to obtain an effect of improving toughness by including the rubber particles.

It is preferred that the rubber particles (C) have a content of 2 parts by mass or more and 70 parts by mass or less, based on 100 parts by mass of total mass of the oxetane compound (A) and the cationic polymerizable compound (B). A content of 5 parts by mass or more and 60 parts by mass or less is more preferred. Within the range of the content of the rubber particles (C), good thermal resistance and toughness are compatible.

<Curing Agent (D)>

As the curing agent (D), a cationic polymerization initiator such as a photocationic polymerization initiator or a thermal cationic polymerization initiator can be used. To the extent that the effect of the present invention is not damaged, the curing agent may be used alone or in combination of two or more. When the three-dimensional shaped object is formed by photocuring, it is preferred to use the photocationic polymerization initiator, due to stability over time of the curable resin composition of the present invention or restriction on the three-dimensional shaping. In addition, as the curing agent (D), for example, other curing agents such as a thermally latent curing agent may be included.

[Cationic Polymerization Initiator]

(Photocationic polymerization initiator) When the curable resin composition of the present invention is used as a curable resin for three-dimensional shaping, it is preferred to use the photocationic polymerization initiator. It is preferred that the photocationic polymerization initiator produces an acid which can initiate cationic polymerization by being irradiated with an energy ray such as, for example, an ultraviolet ray.

As the photocationic polymerization initiator, for example, an onium salt composed of a cationic portion being aromatic sulfonium, aromatic iodonium, aromatic diazonium, aromatic ammonium, thianthrenium, thioxanthonium, or (2,4-cyclopentadiene-1-yl)[(1-methylethyl)benzene]-Fe cation, and an anionic portion being $BF_4^-$, $PF_6^-$, $SbF_6^-$, or $[BX_4]^-$ (with a proviso that X is a phenyl group substituted with at least two or more fluorines or trifluoromethyl groups) can be used alone or in combination of two or more.

For example, bis[4-(diphenyl sulfonio)phenyl]sulfide bishexafluorophosphate, bis[4-(diphenyl sulfonio)phenyl]sulfide bishexafluoroantimonate, bis[4-(diphenyl sulfonio)phenyl]sulfide bistetrafluoroborate, bis[4-(diphenylsulfonio)phenyl]sulfide tetrakis(pentafluorophenyl)borate, diphenyl-4-(phenylthio)phenyl sulfoniumhexafluorophosphate, diphenyl-4-(phenylthio)phenyl sulfoniumhexafluoroantimonate, diphenyl-4-(phenylthio)phenyl sulfoniumtetrafluoroborate, diphenyl-4-(phenylthio)phenyl sulfoniumtetrakis(pentafluorophenyl)borate, triphenyl sulfoniumhexafluorophosphate, triphenylsulfoniumhexafluoroantimonate, triphenylsulfoniumtetrafluoroborate, triphenylsulfoniumtetrakis(pentafluorophenyl)borate, bis[4-(di(4-(2-hydroxyethoxy))phenyl sulfonio)phenyl]sulfide bishexafluorophosphate, bis[4-(di(4-(2-hydroxyethoxy))phenyl sulfonio)phenyl]sulfide bishexafluoroantimonate, bis[4-(di(4-(2-hydroxyethoxy))phenyl sulfonio)phenyl]sulfide bistetrafluoroborate, bis[4-(di(4-(2-hydroxyethoxy))phenyl sulfonio)phenyl]sulfide tetrakis(pentafluorophenyl)borate, or the like can be used as the aromatic sulfonium salt.

In addition, For example, diphenyliodoniumhexafluorophosphate, diphenyliodoniumhexafluoroantimonate, diphenyliodoniumtetrafluoroborate, diphenyliodoniumtetrakis(pentafluorophenyl)borate, bis(dodecylphenyl)iodoniumhexafluorophosphate, bis(dodecylphenyl)iodoniumhexafluoroantimonate, bis(dodecylphenyl)iodoniumtetrafluoroborate, bis(dodecylphenyl)iodoniumtetrakis(pentafluorophenyl)borate, 4-methylphenyl-4-(1-methylethyl)phenyliodoniumhexafluorophosphate, 4-methylphenyl-4-(1-methylethyl)phenyliodoniumhexafluoroantimonate, 4-methylphenyl-4-(1-methylethyl)phenyliodoniumtetrafluoroborate, 4-methylphenyl-4-(1-methylethyl)phenyliodoniumtetrakis(pentafluorophenyl)borate, or the like can be used.

In addition, as the aromatic diazonium salt, for example, phenyldiazoniumhexafluorophosphate, phenyldiazoniumhexafluoroantimonate, phenyldiazoniumtetrafluoroborate, phenyldiazoniumtetrakis(pentafluorophenyl)borate, or the like can be used as the aromatic iodonium salt.

In addition, 1-benzyl-2-cyanopyridiniumhexafluorophosphate, 1-benzyl-2-cyanopyridiniumhexafluoroantimonate, 1-benzyl-2-cyanopyridiniumtetrafluoroborate, 1-benzyl-2-cyanopyridiniumtetrakis(pentafluorophenyl)borate, 1-(naphthylmethyl)-2-cyanopyridiniumhexafluorophosphate, 1-(naphthylmethyl)-2-cyanopyridiniumhexafluoroantimonate, 1-(naphthylmethyl)-2-cyanopyridiniumtetrafluoroborate, 1-(naphthylmethyl)-2-cyanopyridiniumtetrakis(pentafluorophenyl)borate, or the like can be used as the aromatic ammonium salt.

In addition, 5-methylthianthreniumhexafluorophosphate, 5-methyl-10-oxothianthreniumtetrafluoroborate, 5-methyl-10,10-dioxothianthreniumhexafluorophosphate, or the like can be used as the thianthrenium salt.

In addition, S-biphenyl 2-isopropylthioxanthonium hexafluorophosphate, or the like can be used as the thioxanthonium salt.

In addition, (2,4-cyclopentadiene-1-yl)[(1-methylethyl)benzene]-Fe(II)hexafluorophosphate, (2,4-cyclopentadiene-1-yl)[(1-methylethyl)benzene]-Fe(II)hexafluoroantimonate, (2,4-cyclopentadiene-1-yl)[(1-methylethyl)benzene]-Fe(II)tetrafluoroborate, (2,4-cyclopentadiene-1-yl)[(1-methylethyl)benzene]-Fe(II)tetrakis(pentafluorophenyl)borate, or the like can be used as (2,4-cyclopentadiene-1-yl)[(1-methylethyl)benzene]-Fe salt.

As the photocationic polymerization initiator, for example, CPI (R)-100P, CPI (R)-110P, CPI (R)-101A, CPI (R)-200K, and CPI (R)-210S (all manufactured by San-Apro Ltd.), CYRACURE (R) photocuring initiator UVI-6990, CYRACURE (R) photocuring initiator UVI-6992, and CYRACURE (R) photocuring initiator UVI-6976 (all manufactured by Dow Chemical Japan Ltd.), ADEKA OPTOMER SP-150, ADEKA OPTOMER SP-152, ADEKA OPTOMER SP-170, ADEKA OPTOMER SP-172, and ADEKA OPTOMER SP-300 (all manufactured by ADEKA CORPORATION), CI-5102 and CI-2855 (all manufactured by Nippon Soda Co., Ltd.), SAN-AID (R) SI-60L, SAN-AID (R) SI-80L, SAN-AID (R) SI-100L, SAN-AID (R) SI-110L, SAN-AID (R) SI-180L, SAN-AID (R) SI-110, and SAN-AID (R) SI-180 (all manufactured by SANSHIN CHEMICAL INDUSTRY CO., LTD.), ESACURE (R) 1064 and ESACURE (R) 1187 (all manufactured by Lamberti), Omnicat 550 (manufactured by IGM Resins), Irgacure (R) 250 (manufactured by BASF), RHODORSILPHOTOINITIATOR 2074 (manufactured by Rhodia Japan Ltd.), and the like are commercially available.

In the curable resin composition of the present invention, the photocationic polymerization initiator may be used in combination of two or more or alone. In addition, in order to proceed with a polymerization reaction by heat treatment after shaping, other curing agents such as a thermal cationic polymerization initiator may be simultaneously included.

An added amount of the cationic polymerization initiator is preferably 0.1 parts by mass or more and 15 parts by mass or less, and more preferably 0.1 parts by mass or more and 10 parts by mass or less, based on 100 parts by mass of total mass of the oxetane compound (A) and the cationic polymerizable compound (B).

(Thermal Cationic Polymerization Initiator)

A compound containing a cationic species is excited by heating and a thermal decomposition reaction occurs to function as a curing agent to proceed with thermal curing. The thermal cationic polymerization initiator does not cause a viscosity increase overtime or gelation of the resin composition at room temperature, even in the case of being included in the resin composition, unlike acid anhydrides, amines, phenol resins, and the like which are generally used as a curing agent. Thus, it is possible to provide a one-pack resin composition having an excellent handling property.

The thermal cationic polymerization initiator may include, for example, diphenyliodonium hexafluoroarsenate, diphenyliodonium hexafluorophosphate, diphenyliodonium trifluoromethanesulfonate, triphenylsulfoniumtetrafluoroborate, tri-p-tolylsulfonium hexafluorophosphite, tri-p-tolylsulfonium trifluoromethanesulfonate, bis(cyclohexylsulfonyl)diazomethane, bis(tert-butylsulfonyl)diazomethane, bis(p-toluenesulfonyl)diazomethane, triphenylsulfoniumtrifluoromethanesulfonate, diphenyl-4-methylphenylsulfoniumtrifluoromethanesulfonate, diphenyl-2,4,6-trimethylphenylsulfonium-p-toluenesulfonate, diphenyl-p-phenylthiophenylsulfoniumhexafluorophosphite, or the like.

In the curable resin composition of the present invention, as the thermal cationic polymerization initiator, commercially available products, for example, AMERICURE series (manufactured by American Can Co.), ULTRASET series (manufactured by ADEKA CORPORATION), and WPAG series (manufactured by Wako Pure Chemical Corporation) as a diazonium salt-based compound, UVE series (manufactured by General Electric Company), FC series (manufactured by 3M Company), UV9310C (manufactured by GE Toshiba Silicones Co., Ltd.), and WPI series (manufactured by Wako Pure Chemical Corporation) as an iodonium salt-based compound, CYRACURE series (manufactured by Union Carbide Corporation), UVI series (manufactured by General Electric Company), FC series (manufactured by 3M Company), CD series (manufactured by Sartomer), Optomer SP series, Optomer CP series (manufactured by ADEKA CORPORATION), SAN-AID SI series (manufactured by SANSHIN CHEMICAL INDUSTRY CO., LTD.), CI series (manufactured by Nippon Soda Co., Ltd.), WPAG series (manufactured by Wako Pure Chemical Corporation), and CPI series (manufactured by San-Apro Ltd.) as a sulfonium salt-based compound, and the like can be used.

In the curable resin composition of the present invention, the thermal cationic polymerization initiator may be used in combination of two or more or alone. In addition, in order to proceed with a polymerization reaction by heat treatment after shaping, the thermal cationic polymerization initiator which is decomposed at high temperature may be used.

An added amount of the thermal cationic polymerization initiator is preferably 0.1 parts by mass or more and 15 parts by mass or less, and more preferably 0.1 parts by mass or more and 10 parts by mass or less, based on 100 parts by mass of a total mass of the oxetane compound (mass of A) and mass of the cationic polymerizable compound (B).

[Other Curing Agent]

As the curing agent (D), a thermal latent curing agent such as acid anhydrides (an acid anhydride-based curing agent), phenols (a phenol-based curing agent), and polycarboxylic acids, can be used. The thermal latent curing agent refers to a curing agent which proceeds with thermal curing by heating.

As the acid anhydrides, a known or commonly used acid anhydride-based curing agent can be used, and though not particularly limited, for example, methyltetrahydro anhydrous phthalic acid (4-methyltetrahydro anhydrous phthalic acid, 3-methyltetrahydro anhydrous phthalic acid, and the like), methylhexahydro anhydrous phthalic acid (4-methylhexahydro anhydrous phthalic acid, 3-methylhexahydro anhydrous phthalic acid, and the like), dodecenyl anhydrous succinic acid, methylendomethylenetetrahydro anhydrous phthalic acid, anhydrous phthalic acid, anhydrous maleic acid, tetrahydro anhydrous phthalic acid, hexahydro anhydrous phthalic acid, methylcyclohexenedicarboxylic anhydride, anhydrous pyromellitic acid, anhydrous trimellitic acid, benzophenonetetracarboxylic anhydride, anhydrous nadic acid, anhydrous methylnadic acid, hydrogenated methylnadic anhydride, 4-(4-methyl-3-pentenyl)tetrahydro anhydrous phthalic acid, anhydrous succinic acid, anhydrous adipic acid, anhydrous sebacic acid, anhydrous dodecane diacid, methylcyclohexenetetracarboxylic anhydride, a vinylether-anhydrous maleic acid copolymer, an alkylstyrene-anhydrous maleic acid copolymer, and the like can be used. Among them, in view of a handling property, an acid anhydride which is liquid at 25° C. (for example, methyltetrahydro anhydrous phthalic acid, methylhexahydro anhydrous phthalic acid, dodecenyl anhydrous succinic acid, methylendomethylenetetrahydro anhydrous phthalic acid, and the like) is preferred. Meanwhile, an acid anhydride which is solid at 25° C. is dissolved in the acid anhydride which is liquid at 25° C. to form a liquid mixture, whereby the handling property as the curing agent (D) in the curable resin composition of the present invention tends to be improved. As the acid anhydride-based curing agent, in view of thermal resistance and transparency of the cured product, an anhydride of saturated monocyclic hydrocarbon dicarboxylic acid (also including those having a substituent such as an alkyl group bonded to the ring) is preferred.

As the phenols, a known or commonly used phenol-based curing agent can be used, and though not particularly limited, for example, aralkyl resins such as for example, a novolac type phenol resin, a novolac type cresol resin, a paraxylylene modified phenol resin, and a paraxylylene metaxylylene modified phenol resin, a terpene modified phenol resin, a dicyclopentadiene modified phenol resins, triphenol propane, and the like can be included.

The polycarboxylic acids may include, for example, adipic acid, sebacic acid, terephthalic acid, trimellitic acid, carboxyl group-containing polyester, and the like.

An added amount of other curing agents is preferably 0.1 parts by mass or more and 75 parts by mass or less, and more preferably 5 parts by mass or more and 30 parts by mass or less, based on 100 parts by mass of total mass of the oxetane compound (A) and the cationic polymerizable compound (B).

<Other Components (Additive)>

The curable resin composition of the present invention may include various additives as other optional components, to the extent that the objective or effect of the present invention is not damaged. The additive as such may include resins such as an epoxy resin, polyurethane, polychloroprene, polyester, polysiloxane, a petroleum resin, a xylene resin, a ketone resin, and a cellulose resin; engineering plastics such as polycarbonate, modified polyphenylene ether, polyamide, polyacetal, polyethylene terephthalate, polybutylene terephthalate, ultrahigh molecular polyethylene, polyphenylsulfone, polysulfone, polyarylate, polyetherimide, polyetherether ketone, polyphenylenesulfide, polyether sulfone, polyamideimide, a liquid crystal polymer, polytetrafluoroethylene, polychlorotrifluoroethylene, and polyvinylidene fluoride; reactive monomers such as a fluorine-based oligomer, a silicone-based oligomer, a polysulfide-based oligomer, a fluorine-containing monomer, and a siloxane structure-containing monomer; soft metals such as gold, silver, and lead; layered crystal structure materials such as graphite, molybdenum disulfide, tungsten disulfide, boron nitride, graphite fluoride, calcium fluoride, barium fluoride, lithium fluoride, silicon nitride, and molybdenum selenide; polymerization inhibitors such as phenothiazine and 2,6-di-t-butyl-4-methylphenol; photosensitizers such as a benzoin compound, an acetophenone compound, an anthraquinone compound, a thioxantone compound, a ketal compound, a benzophenone compound, a tertiary amine compound, and a xanthone compound; polymerization initiation aids; leveling agents; wettability improving agents; surfactants; plasticizers; ultraviolet absorbers; silane coupling agents; inorganic fillers; pigments; dyes; antioxidants; flame retardants; thickeners; defoamers; and the like.

As the additive, a radical polymerizable compound, for example, a (meth)acrylate compound and the like may be included.

The (meth)acrylate compound may include a monofunctional (meth)acrylate compound having one (meth)acryloyl group in the molecule, a polyfunctional (meth)acrylate compound having two or more (meth)acryloyl groups, and the like. In the present invention, any polymerizable (meth) acrylate compound which can be polymerized by a general method can be used. The monofunctional (meth)acrylate compound and the polyfunctional (meth)acrylate compound can be used by optionally mixing one or more kinds.

The monofunctional (meth)acrylate compound may include methyl (meth)acrylate, ethyl (meth)acrylate, n-butyl (meth)acrylate, isobutyl (meth)acrylate, t-butyl (meth)acrylate, 2-ethylhexyl (meth)acrylate, n-octyl (meth)acrylate, i-octyl (meth)acrylate, lauryl (meth)acrylate, stearyl (meth) acrylate, cyclohexyl (meth)acrylate, isobornyl (meth)acrylate, adamantly (meth)acrylate, 2-hydroxyethyl (meth)acrylate, 2-hydroxypropyl (meth)acrylate, 2-hydroxybutyl (meth)acrylate, 4-hydroxybutyl (meth)acrylate, glycidyl (meth)acrylate, tetrahydrofurfuryl (meth)acrylate, phenylglycidyl (meth)acrylate, dimethylaminomethyl (meth) acrylate, phenylcellosolve (meth)acrylate, dicyclopentenyl (meth)acrylate, dicyclopentenyloxyethyl(meth)acrylate, biphenyl (meth)acrylate, 2-hydroxyethyl (meth)acryloylphosphate, phenyl (meth)acrylate, phenoxyethyl (meth) acrylate, phenoxypropyl (meth)acrylate, benzyl (meth)acrylate, and the like.

The polyfunctional (meth)acrylate compound may include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, 1,3-butylene glycol di(meth)acrylate, 1,4-butanediol di(meth)acrylate, dimethylol tricyclodecane di(meth)acrylate, trimethylolpropane tri(meth)acrylate, neopentyl glycol di(meth)acrylate, 1,6-hexamethylene di(meth) acrylate, hydroxypyvalic acid ester neopentyl glycol di(meth)acrylate, pentaerythritol tri(meth)acrylate, pentaerythritol tetra(meth)acrylate, ditrimethylolpropane tetraacrylate, dipentaerythritol tetra(meth)acrylate, dipentaerythritol penta (meth)acrylate, dipentaerythritol hexa(meth)acrylate, tris (meth)acryloxyethyl isocyanurate, and the like.

For expression of the effect of the present invention, it is preferred that a content of the radical polymerizable compound is 0 parts by mass or more and 80 parts by mass or less, based on 100 parts by mass of total mass of the oxetane compound (A) and the cationic polymerizable compound (B). When the amount of the radical polymerizable compound is excessive, there is a concern of damaging the effect of the present invention.

In the present invention, in particular when the radical polymerizable compound is included, a radical polymerization initiator may be included. The radical polymerization initiator may include a photoradical polymerization initiator or a thermal radical polymerization initiator.

The photoradical polymerization initiator is mainly classified into a intramolecular cleavage type and a hydrogen drawing type. In the photoradical polymerization initiator of the intramolecular cleavage type, light at a specific wavelength is absorbed, thereby cutting a bond at a specific site, and a radical occurs in the cut site, which becomes a polymerization initiator to initiate polymerization of the radical polymerizable compound. Meanwhile, in the case of the hydrogen drawing type, light at a specific wavelength is absorbed to be excited state, and the excited species causes a hydrogen drawing reaction from a surrounding hydrogen donor to produce a radical, which becomes a polymerization initiator to initiate polymerization of the radical polymerizable compound.

As the intramolecular cleavage type photoradical polymerization initiator, an alkylphenone-based photoradical polymerization initiator, an acylphosphine oxide-based photoradical polymerization initiator, and an oxime ester-based photoradical polymerization initiator are known. These are the types in which a bond adjacent to a carbonyl group is α-cleaved to produce a radical species. The alkylphenone-based photoradical polymerization initiator may include a benzylmethylketal-based photoradical polymerization initiator, an α-hydroxyalkylphenone-based photoradical polymerization initiator, an aminoalkylphenone-based photoradical polymerization initiator, or the like. The specific example thereof may include, for example, 2,2'-dimethoxy-1,2-diphenylethan-1-one (product name: "Irgacure (R) 651", manufactured by BASF) and the like as a benzylmethylketal-based photoradical polymerization initiator, 2-hydroxy-2-methyl-1-phenylpropane-1-one (product name: "Darocur (R) 1173", manufactured by BASF), 1-hydroxycyclohexylphenylketone (product name: "Irgacure (R) 184", manufactured by BASF), 1-[4-(2-hydroxyethoxy)phenyl]-2-hydroxy-2-methyl-1-propan-1-one (product name: "Irgacure (R) 2959", manufactured by BASF), 2-hydroxy-1-{4-[4-(2-hydroxy-2-methylpropionyl)benzyl]phenyl}-2-methylpropan-1-one (product name: "Irgacure (R) 127", manufactured by BASF), and the like as an α-hydroxyalkylphenone-based photoradical polymerization initiator, 2-methyl-1-(4-methylthiophenyl)-2-morpholinopropan-1-one (product name: "Irgacure (R) 907", manufactured by BASF) or 2-benzylmethyl-2-dimethylamino-1-(4-morpholinophenyl)-1-butanone (product name: "Irgacure(R) 369", manufactured by BASF) as an aminoalkylphenone-based photoradical polymerization initiator, and the like, but is not limited thereto. The acylphosphineoxide-based photoradical polymerization initiator may include 2,4,6-trimethylbenzoyldiphenylphosphineoxide (product name: "Lucirin (R) TPO", manufactured by BASF), bis(2,4,6-trimethylbenzoyl)-phenylphosphineoxide (product name: "Irgacure (R) 819", manufactured by BASF), and the like, but not limited thereto. The oximeester-based photoradical polymerization initiator may include (2E)-2-(benzoyloxyimino)-1-[4-(phenylthio)phenyl]octan-1-one (product name: "Irgacure (R) OXE-01", manufactured by BASF), and the like, but is not limited thereto.

The hydrogen drawing type photoradical polymerization initiator may include anthraquinone derivatives such as 2-ethyl-9,10-anthraquinone and 2-t-butyl-9,10-anthraquinone, and thioxanthone derivatives such as isopropylthioxanthone and 2,4-diethylthioxanthone, but is not limited thereto.

In the present invention, the photoradical polymerization initiator may be used in combination of two or more or alone.

An added amount of the photoradical polymerization initiator is preferably 0.1 parts by mass or more and 15 parts by mass or less, and more preferably 0.1 parts by mass or more and 10 parts by mass or less, based on 100 parts by mass of the radical polymerizable compound.

In addition, as the thermal radical polymerization initiator, a compound which is conventionally already known can be used without particular limitation as long as the compound produces a radical by heating, and for example, an azo-based compound, a peroxide, and a persulfate salt are preferred. The azo-based compound may include 2,2'-azobisisobutyronitrile, 2,2'-azobis(methylisobutylrate), 2,2'-azobis-2,4-dimethylvaleronitrile, 1,1'-azobis(1-acetoxy-1-phenylethane), and the like. The peroxide may include benzoyl peroxide, di-t-butylbenzoyl peroxide, t-butylperoxypivalate, and di(4-t-butylcyclohexyl)peroxydicarbonate, and the like. The persulfate may include persulfate salts such as ammonium persulfate, sodium persulfate, and potassium persulfate.

An added amount of the thermal radical polymerization initiator is preferably 0.1 parts by mass or more and 15 parts by mass or less, and more preferably 0.1 parts by mass or more and 10 parts by mass or less, based on 100 parts by mass of the radical polymerizable compound.

<Curable Resin Composition>

The curable resin composition of the present invention can be prepared by adding the oxetane compound (A), the cationic polymerizable compound (B), the rubber particles (C), the curing agent (D), and if necessary, an appropriate amount of other optional components to a stirring vessel, and performing stirring at usually 30° C. or more and 120° C. or less, and preferably 50° C. or more and 100° C. or less. A stirring time at this time is usually 1 minute or more and 6 hours or less, and preferably 10 minutes or more and 2 hours or less.

Viscosity of the curable resin composition of the present invention at 25° C. is preferably 50 Pa·s or more and 10,000 mPa·s or less, and more preferably 70 mPa·s or more and 5,000 mPa·s or less.

The thus-obtained curable resin composition of the present invention is preferably used as the photocurable resin composition in an optical three-dimensional shaping method. That is, by the optical three-dimensional shaping method in which the curable resin composition of the present invention is selectively irradiated with an active energy ray such as an ultraviolet ray, an electron beam, an X-ray, and a radiation to supply energy required for curing, a three-dimensional shaped object having a desired shape can be manufactured.

<Cured Product>

The curable resin composition of the present invention has the oxetane compound (A), the cationic polymerizable compound (B), the rubber particles (C), and the curing agent (D) as essential components, and by curing the components, the cured product can be obtained. A curing method can be performed using any known method such as active energy ray curing or thermal curing, depending on the curing agent to be included. The curing method may be a combination of a plurality of types.

<Manufacturing Method of Three-Dimensional Shaped Object>

The curable resin composition of the present invention can be preferably used in the optical three-dimensional shaping method by including the photocationic polymerization initiator as the curing agent (D). The cured product of the curable resin composition may be manufactured using any one of the conventionally already known optical three-dimensional shaping methods and devices. A representative example of the preferred optical three-dimensional shaping method is a method of photocuring the curable resin composition of the present invention by layer based on a slice data of a three-dimensional model to manufacture a three-dimensional object. Specifically, the curable resin composition of the present invention forming a liquid phase is selectively irradiated with an active energy ray based on a slice data, so that a cured layer having a predetermined pattern is obtained, thereby forming a cured layer. Next, the uncured curable resin composition of the present invention is supplied to the cured layer, and the active energy ray is irradiated thereon based on a slice data likewise to newly form a cured layer which is continuous with the cured layer. By repeating the lamination operation, a three-dimensional shaped object to be desired is finally obtained.

The active energy ray may include an ultraviolet ray, an electron beam, an X-ray, a radiation ray, and the like. Among them, the ultraviolet ray including a wavelength of 300 nm or more and 450 nm or less is preferably used from an economical perspective. As a light source, ultraviolet laser (for example, Ar laser, He—Cd laser, or the like), a mercury lamp, a xenon lamp, a halogen lamp, a fluorescent lamp, and the like can be used. Among them, a laser light source is preferably adopted, since the laser light source raises an energy level to shorten a shaping time and also has an excellent light condensing property to obtain a high shaping precision degree.

In the formation of each cured resin layer having a predetermined shape pattern by irradiating a shaped surface formed of the curable resin composition with the active energy ray, the active energy ray concentrated in a dot shape such as laser light may be used to scan to form the cured resin layer in a dot drawing or line drawing manner. In addition, a shaping method in which the shaped surface is irradiated with the active energy ray in a planar shape through a planar plotting mask formed by arranging a plurality of micro-optical shutters such as a liquid crystal shutter or a digital micromirror shutter, thereby forming the cured resin layer, may be adopted.

A representative example of the optical three-dimensional shaping method is described as follows. First, a supporting stage provided to be vertically movable in a storage container is lowered in a minute quantity (settled) from a liquid surface of the resin composition, thereby supplying the resin composition on the supporting stage to form a resin composition layer (1). Next, the resin composition layer (1) is selectively irradiated with light to form the cured resin layer (1) in a solid phase. Next, on the cured resin layer (1), the curable resin composition is supplied to form a resin composition layer (2), and the resin composition layer (2) is selectively irradiated with light to form a new cured resin layer (2) on the cured resin layer (1) so that the new cured resin layer (2) is continuously and integrally laminated on the cured resin layer (1). Then, the process is repeated a predetermined number of times with or without change of the pattern to be light-irradiated, thereby shaping a three-dimensional shaped object formed by a plurality of cured resin layers (1, 2, . . . n) which is integrally laminated.

The thus-obtained three-dimensional shaped object is taken out of the storage container, an unreacted curable resin composition remaining on the surface is removed, and if necessary, the container is cleaned. Here, a cleaning agent may include an alcohol-based organic solvents represented by alcohols such as isopropyl alcohol and ethanol; a ketone-based organic solvent represented by acetone, methylethylketone, and the like; an ester-based organic solvent represented by ethyl acetate and the like; and an aliphatic-based organic solvent represented by terpenes. In addition, after cleaning with the cleaning agent, postcuring by light-irradiation or heat-irradiation may be performed. The postcuring can cure the unreacted curable resin composition which may remain on the surface of or inside the three-dimensional shaped object, and can improve initial strength of a shaped object, in addition to suppressing stickiness on the surface of the shaped object.

EXAMPLES

Hereinafter, the present invention will be described in detail by the Examples; however, the present invention is not limited to the Examples.

<Materials>

Hereinafter, the materials used in the Examples and the Comparative Examples are listed.

[Oxetane compound (A)]

A1: the following compounds (product name: "OXT-101", manufactured by Toagosei Company, Limited)

A2: 3-(Hydroxymethyl)-3-methyloxetane (manufactured by Tokyo Chemical Industry Co., Ltd.)

[Cationic Polymerizable Compound (B)]

B1: Bisphenol A diglycidyl ether (product name: "JER828", manufactured by Mitsubishi Chemical Corporation, reactive group equivalent: 184 g/eq or more and 194 g/eq or less)

B2: Epoxidized polybutadiene (product name: "JP-100", manufactured by Nippon Soda Co., Ltd., reactive group equivalent: 210 g/eq)

[Cationic Polymerizable Compound (B3)+Core Shell Type Rubber Particles (C1)]

B3+C1: A liquid masterbatch (product name: "KANEACE MX-153", manufactured by KANEKA CORPORATION, C1 content of 33 wt %, reactive group equivalent of B3 of 270 g/eq) in which core shell type rubber particles (C1; an average particle diameter of 100 nm, core component: crosslinked polybutadiene, shell: PMMA/glycidylmethacrylate/styrene copolymerized product) are dispersed as single particles in a bisphenol A type epoxy resin (B3).

[Curing Agent (D)]

D1: Photocationic polymerization initiator (product name: "CPI (R)-210S", manufactured by San-Apro Ltd.)

[Other Compound (E)]

E1: The following compound (product name: "OXT-212", manufactured by Toagosei Company, Limited)

[Acetone Dispersion of Core Shell Type Rubber Particles]

(Acetone Dispersion of Core Shell Type Rubber Particles C1)

To a liquid masterbatch (product name: "KANEACE MX-153", manufactured by KANEKA CORPORATION) in which core shell type rubber particles (C1) were dispersed as single particles in a bisphenol A type epoxy resin (B3), acetone was added, centrifugation was performed, a supernatant was removed, and B3 was removed, and this operation was repeated, thereby obtaining an acetone dispersion of C1.

(Acetone Dispersion of Core Shell Type Rubber Particles C2)

To a 0.3 L glass container, 46 parts by mass of polybutadiene latex (product name: "Nipol LX111A2", manufactured by Zeon Corporation) (corresponding to 25 parts by mass of polybutadiene rubber particles) and 79 parts by mass of deionized water were added, stirring was performed at 60° C. while nitrogen substitution is performed. 0.0012 parts by mass of disodium ethylenediaminetetraacetate (EDTA), 0.0003 parts by mass of ferrous sulfate heptahydrate, and 0.06 parts by mass of sodiumformaldehyde sulfoxylate were added, and then a mixture of 8.8 parts by mass of a radical polymerizable compound (4.4 parts by mass of methyl methacrylate (MMA) and 4.4 parts by mass of 3-methyl-3-oxetanyl-methyl methacrylate (product name: "OXMA", manufactured by Ube Industries, Ltd.)) forming a shell layer and 0.0015 parts by mass of cumene hydroperoxide was continuously added over 2 hours, thereby graft-polymerizing the radical polymerizable compound on the surface of polybutadiene rubber particles. After completing the addition, stirring was performed again for 2 hours and the reaction was completed, thereby obtaining an aqueous dispersion of core shell type rubber particles C2 having the polybutadiene rubber as a core and a polymer of the radical polymerizable compound as a shell.

The thus-obtained aqueous dispersion of core shell type rubber particles was added to 150 parts by mass of acetone and uniformly mixed. Centrifugation was performed using a centrifuge at the number of revolutions of 12000 rpm at a temperature of 10° C. for 30 minutes, and a supernatant was removed. To the settled core shell type rubber particles, acetone was added, redispersion was performed, and centrifugation and removal of the supernatant were repeated twice under the same condition as the above, thereby obtaining an acetone dispersion of core shell type rubber particles (C2). An average particle diameter of the core shell type rubber particles (C2) (25° C.) determined from a maximum value of a particle size distribution curve (particle diameter-scattering intensity) using a particle size distribution meter (product name: Zetasizer Nano ZS, manufactured by Malvern Panalytical Ltd.) was 0.30 μm.

(Acetone Dispersion of Core Shell Type Rubber Particles C3)

An acetone dispersion of core shell type rubber particles (C3) was obtained in the same manner as in Acetone dispersion of core shell type rubber particles C2, except that the amount of the radical polymerizable compound forming the shell layer is changed to 4.4 parts by mass (3.5 parts by mass of MMA, 0.9 parts by mass of OXMA). An average particle diameter of core shell type rubber particles (C3) (25° C.) determined from a maximum value of a particle size distribution curve using a particle size distribution meter was 0.34 μm.

<Preparation of Curable Resin Composition>

Example 1

OXT-101 (A1; 43 parts by mass), JER828 (B1; 6 parts by mass), KANEACE MX-153 (B3+C1; 76 parts by mass), and CPI (R)-210S (D1; 2 parts by mass) were blended, and mixed using a rotation-revolution mixer (product name: "AWATORI RENTARO AR-100", manufactured by THINKY CORPORATION), thereby obtaining a uniform curable resin composition.

Example 2

OXT-101 (A1; 37 parts by mass), JP-100 (B2; 12 parts by mass), KANEACE MX-153 (B3+C1; 76 parts by mass), and CPI (R)-210S (D1; 2 parts by mass) were blended, and mixed using a rotation-revolution mixer (product name: "AWATORI RENTARO AR-100", manufactured by THINKY CORPORATION), thereby obtaining a uniform curable resin composition.

Example 3

OXT-101 (A1; 43 parts by mass), KANEACE MX-153 (B3+C1; 85 parts by mass), an acetone dispersion of rubber particles (C1; 5 parts by mass), and CPI (R)-210S (D1; 2 parts by mass) were blended, heated to 75° C., and stirred with a stirrer for 2 hours to completely remove a residual solvent (acetone), and then a curable resin composition was obtained.

Example 4

3-(Hydroxymethyl)-3-methyloxetane (A2; 43 parts by mass), JER828 (B1; 6 parts by mass), KANEACE MX-153 (B3+C1; 76 parts by mass), and CPI (R)-210S (D1; 2 parts by mass) were blended, and mixed using a rotation-revolution mixer (product name: "AWATORI RENTARO AR-100", manufactured by THINKY CORPORATION), thereby obtaining a uniform curable resin composition.

Example 5

OXT-101 (A1; 30 parts by mass), JER828 (B1; 19 parts by mass), KANEACE MX-153 (B3+C1; 76 parts by mass), and CPI (R)-210S (D1; 2 parts by mass) were blended, and mixed using a rotation-revolution mixer (product name: "AWATORI RENTARO AR-100", manufactured by THINKY CORPORATION), thereby obtaining a uniform curable resin composition.

Example 6

OXT-101 (A1; 49 parts by mass), KANEACE MX-153 (B3+C1; 76 parts by mass), and CPI (R)-210S (D1; 2 parts by mass) were blended, and mixed using a rotation-revolution mixer (product name: "AWATORI RENTARO AR-100", manufactured by THINKY CORPORATION), thereby obtaining a uniform curable resin composition.

Example 7

OXT-101 (A1; 43 parts by mass), JER828 (B1; 57 parts by mass), an acetone dispersion of rubber particles (C2; 25 parts by mass), and CPI (R)-210S (D1; 2 parts by mass) were blended, heated to 75° C., and stirred with a stirrer for 2 hours to completely remove a residual solvent (acetone), and then a curable resin composition was obtained.

Example 8

OXT-101 (A1; 43 parts by mass), JER828 (B1; 57 parts by mass), an acetone dispersion of rubber particles (C3; 25 parts by mass), and CPI (R)-210S (D1; 2 parts by mass) were blended, heated to 75° C., and stirred with a stirrer for 2 hours to completely remove a residual solvent (acetone), and then a curable resin composition was obtained.

Comparative Example 1

OXT-101 (A1; 65 parts by mass), KANEACE MX-153 (B3+C1; 52 parts by mass), an acetone dispersion of rubber particles (C1; 8 parts by mass), and CPI (R)-210S (D1; 2 parts by mass) were blended, heated to 75° C., and stirred with a stirrer for 2 hours to completely remove a residual solvent (acetone), and then a curable resin composition was obtained.

Comparative Example 2

OXT-101 (A1; 20 parts by mass), JER828 (B1; 29 parts by mass) KANEACE MX-153 (B3+C1; 76 parts by mass), and CPI (R)-210S (D1; 2 parts by mass) were blended, and mixed using a rotation-revolution mixer (product name: "AWATORI RENTARO AR-100", manufactured by THINKY CORPORATION), thereby obtaining a uniform curable resin composition.

Comparative Example 3

JER828 (B1; 19 parts by mass) KANEACE MX-153 (B3+C1; 76 parts by mass), and CPI (R)-210S (D1; 2 parts by mass) were blended, and mixed using a rotation-revolution mixer (product name: "AWATORI RENTARO AR-100", manufactured by THINKY CORPORATION), thereby obtaining a uniform curable resin composition.

For the above-prepared curable resin compositions of Examples 1 to 8 and Comparative Examples 1 to 3, the blending ratio of each component and the reactive group equivalent of component (B) are shown in Table 1.

<Creation of Specimen>

A cured product was created from the prepared curable resin composition, by the following method. First, a mold having a length of 80 mm, a width of 10 mm and a thickness of 4 mm was interposed between two sheets of quarts glass, and the curable resin composition was flowed thereinto. The flowed curable resin composition was irradiated for 120 seconds for each time with an ultraviolet ray at 5 mW/cm$^2$ from both surfaces of the mold with an UV irradiator (product name: "LIGHT SOURCE EXECURE3000", manufactured by HOYA CANDEO OPTRONICS) to perform precuring. Thereafter, the ultraviolet ray was irradiated again for 600 seconds for each time from the both surfaces of the mold to perform the curing (total energy of 7200 mJ/cm$^2$), thereby obtaining a cured product. The obtained cured product was heat treated in a heated oven at 50° C. for 1 hour, and then heat treated in a heated oven at 100° C. for 2 hours, thereby obtaining a specimen having a length of 80 mm, a width of 10 mm, and a thickness of 4 mm.

<Evaluation>

[Temperature of Deflection Under Load]

The specimen was heated from room temperature at 2° C./min, with a bending stress of 1.80 MPa, using a tester of a temperature of deflection under load (product name: "No. 533 HDT test device 3M-2", manufactured by Toyo Seiki Seisaku-sho, Ltd.), in accordance with JIS K 7191-2. A temperature at which a deflection amount of the specimen reached 0.34 mm was determined as a temperature of deflection under load, which was an indicator of thermal resistance. The obtained results are shown in Table 1. The values in Table 1 represent a temperature of deflection under load, and for the evaluation of thermal resistance, a temperature of deflection under load of 80° C. or more was indicated as A (very good), a temperature of 60° C. or more and less than 80° C. was indicated as B (good), and a temperature less than 60° C. was indicated as C (poor).

[Charpy Impact Strength]

In accordance with JIS K 7111, a notch having a depth of 2 mm at 45° was made on a center portion of the specimen with a notch forming machine (product name: "Notching Tool A-4', manufactured by Toyo Seiki Seisaku-sho, Ltd.). The specimen was destroyed at an energy of 2 J from a rear side of the notch of the specimen using an impact testing machine (product name: "IMPACT TESTER IT", manufactured by Toyo Seiki Seisaku-sho, Ltd.). The energy required for destruction was calculated from an angle at which a hammer swung up to 150° swung up after the destruction of the specimen, and the energy was set as a Charpy impact strength, which was an indicator of toughness. The obtained results are shown in Table 1. The values in Table 1 represent a Charpy impact strength, and for the evaluation of toughness, a Charpy impact strength of 8 kJ/m$^2$ or more was indicated as A (very good), a Charpy impact strength of 5 kJ/m$^2$ or more and less than 8 kJ/m$^2$ was indicated as B (good), and a Charpy impact strength less than 5 kJ/m$^2$ was indicated as C (poor).

TABLE 1

| | | Example | | | | | | | | Comparative Example | | | |
|---|---|---|---|---|---|---|---|---|---|---|---|---|---|
| | Compound | 1 | 2 | 3 | 4 | 5 | 6 | 7 | 8 | 1 | 2 | 3 | 4 |
| Composition (parts by weight) | A1 | 43 | 37 | 43 | | 30 | 50 | 43 | 43 | 65 | 20 | 10 | |
| | A2 | | | | 43 | | | | | | | | |
| | B1 | 6 | | | 6 | 19 | | 57 | 57 | | 29 | 39 | 19 |
| | B2 | | 13 | | | | | | | | | | |
| | B3 | 51 | 50 | 57 | 51 | 51 | 50 | | | 35 | 51 | 51 | 51 |
| | C1 | 25 | 25 | 33 | 25 | 25 | 25 | | | 25 | 25 | 25 | 25 |
| | C2 | | | | | | | 25 | | | | | |
| | C3 | | | | | | | | 25 | | | | |
| | D1 | 2 | 2 | 2 | 2 | 2 | 2 | 2 | 2 | 2 | 2 | 2 | 2 |
| | E1 | | | | | | | | | | | | 30 |
| Reactive group equivalent of cationic polymerizable compound (B) (g/eq.) | | 182 | 186 | 181 | 182 | 184 | 181 | 194 | 194 | 181 | 194 | 187 | 184 |
| Evaluation | Temperature of deflection under load (° C.) | 78 | 85 | 78 | 68 | 105 | 64 | 72 | 74 | 35 | 110 | 118 | 32 |
| | | B | B | B | B | A | B | B | B | C | A | A | C |
| | Charpy impact strength (kJ/m$^2$) | 7.6 | 7.4 | 8.1 | 10.8 | 5.6 | 10.5 | 8.4 | 8.8 | 10.4 | 1.8 | 1.3 | 7.5 |
| | | B | B | A | A | B | A | A | A | A | C | C | B |

Figure 1:
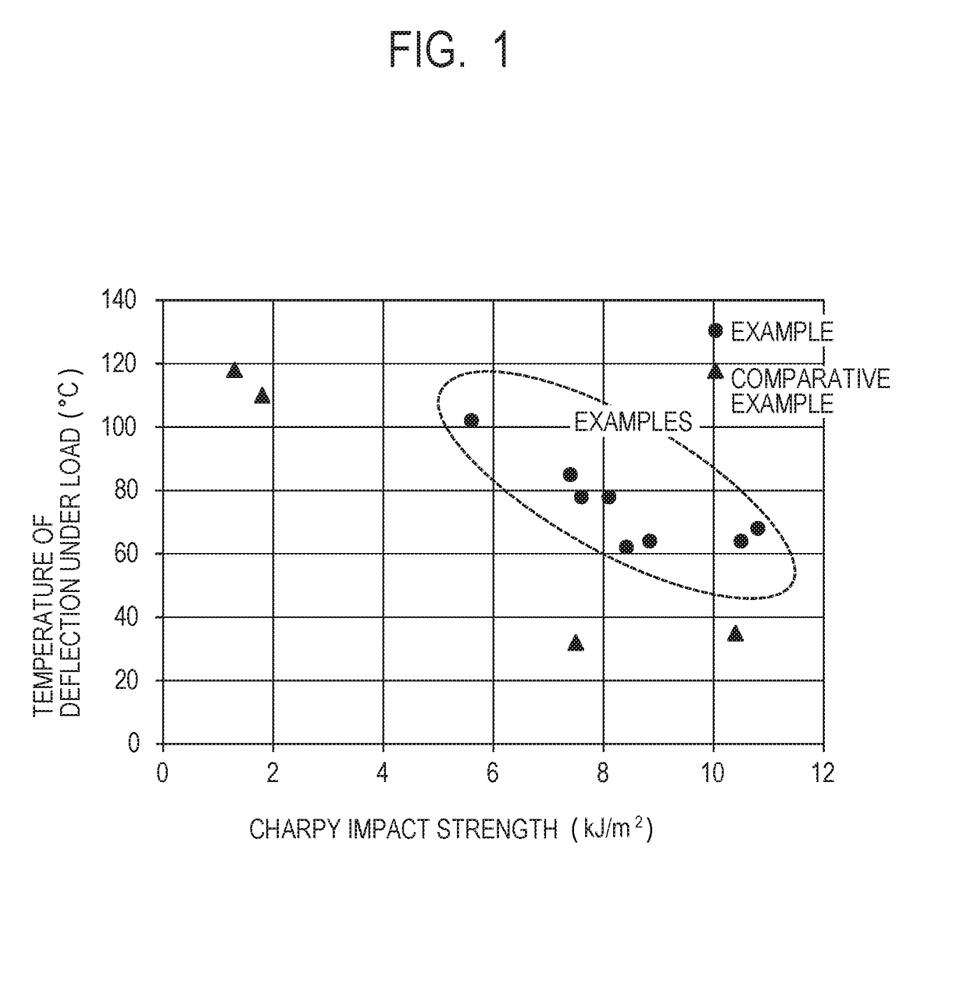
FIG. 1 is a graph showing a relationship between a Charpy impact strength and a temperature of deflection under load of the cured product of Examples and Comparative Examples.

The results of the Charpy impact strength and the temperature of deflection under load shown in Table 1 are shown in FIG. 1, in which the Examples are plotted as ●, and the Comparative Examples are plotted as ▲. As shown in FIG. 1, the cured products obtained from the curable resin compositions of the present invention (Examples 1 to 6) had an excellent balance of toughness and thermal resistance, as compared with the cured products (Comparative Examples 1 to 4) obtained from the compositions which do not include the oxetane compound (A) within the range of 30 parts by mass or more and 60 parts by mass or less, based on 100 parts by mass of total mass of the oxetane compound (A) and the cationic polymerizable compound (B), and thus, the cured products of the present invention are preferred for obtaining the effect of the present invention. For example, the cured products obtained from the curable resin compositions of the present invention represented as Examples 1 and 2 showed equivalent toughness but much better thermal resistance, as compared with the cured product of the resin composition represented as Comparative Example 4 which does not include the oxetane compound (A) of the present invention.

Figure 2:
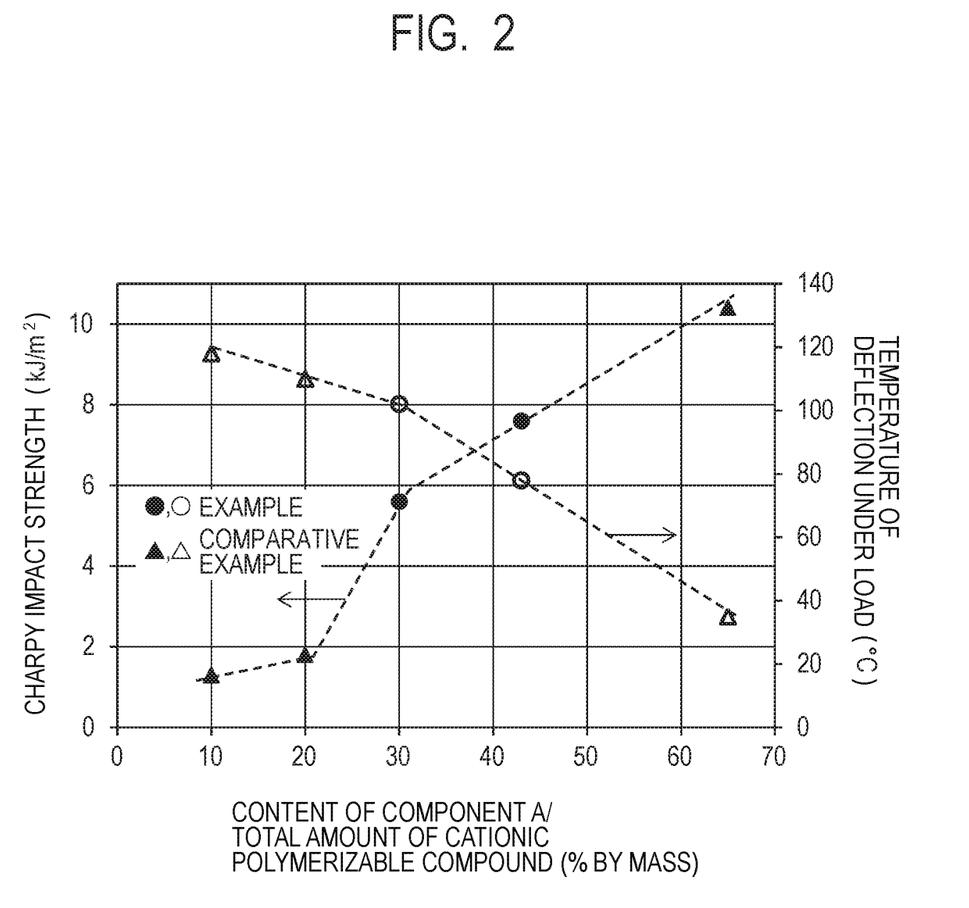
FIG. 2 is a graph showing a relationship between a content ratio of the oxetane compound (A) in the curable resin composition of the present invention, and a Charpy impact strength and a temperature of deflection under load.

In addition, results of the content ratio of the oxetane compound (A) relative to the total amount of the oxetane compound (A) and the cationic polymerizable compound (B), and the Charpy impact strength or the temperature of deflection under load are shown in FIG. 2, in which for Example 1, Example 5, and Comparative Examples 1 to 3, the Examples are plotted as ● and ○, and the Comparative Examples are plotted as ▲ and △. Here, the temperature of deflection under load (○ and △) tends to be linearly decreased with the increase of the content ratio of the oxetane compound (A). However, it was found that the Charpy impact strength (● and ▲) showed a nonlinear significant increase, at the vicinity of 30% by mass of the ratio of the oxetane compound (A) relative to total mass of the oxetane compound (A) and the cationic polymerizable compound (B) in the curable resin composition of the present invention. That is, it was found that the cured product obtained from the curable resin composition of the present invention has an excellent Charpy impact strength beyond the usually predictable range. As a result, it is clear that the curable resin composition of the present invention has an effect of having compatibility between excellent thermal resistance and excellent toughness, against expectation.

From the above results, it is clear that the curable resin composition of the present invention has excellent effect of having compatibility between toughness and thermal resistance, and thus, can be preferably used in optical three-dimensional shaping.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-078104, filed Apr. 16, 2018, and Japanese Patent Application No. 2019-057991, filed Mar. 26, 2019, which are hereby incorporated by reference herein in their entirety.

What is claimed is:

1. A curable resin composition comprising:
    an oxetane compound (A) having one oxetanyl group as a cationic polymerizable reactive group and at least one hydroxyl group;
    a cationic polymerizable compound (B) which is a cationic polymerizable compound other than the oxetane compound (A) and has two or more cationic polymerization reactive groups;
    a particle (C) having a core-shell structure in which a core is covered with a shell; and
    a curing agent (D),
    wherein the oxetane compound (A) is contained at 30 parts by mass to 60 parts by mass, based on 100 parts by mass of a total mass of the oxetane compound (A) and the cationic polymerizable compound (B),
    wherein the particle (C) contains the shell at a mass ratio of 1 part by mass to 200 parts by mass based on 100 parts by mass of the core,
    wherein the core comprises at least one selected from the group consisting of a butadiene rubber particle, a crosslinked butadiene rubber particle, a styrene/butadiene copolymerized rubber particle, an acryl rubber particle, and an acryl/silicone composite rubber particle,
    wherein the shell has a group capable of reacting with the oxetane compound (A) or the cationic polymerizable compound (B), and
    wherein the curable resin composition does not contain a radical polymerizable compound different from the oxetane compound (A) and the cationic polymerizable compound (B).

2. The curable resin composition according to claim 1, wherein the group capable of reacting with the oxetane compound (A) or the cationic polymerizable compound (B) is at least one group selected from the group consisting of a glycidyl group, an oxetanyl group, a hydroxyl group, and a carboxyl group.

3. The curable resin composition according to claim 2, wherein at least a portion of the shell comprises a resin selected from the group consisting of a (meth)acrylic acid ester-based copolymer, a copolymer of (meth)acrylic acid ester with glycidyl (meth)acrylate, and a copolymer of (meth)acrylic acid ester, glycidyl (meth)acrylate, and styrene.

4. The curable resin composition according to claim 1, wherein the cationic polymerizable compound (B) has at least two epoxy groups as the cationic polymerization reactive group and contains 20% by mass to 100% by mass of a compound having a reactive group equivalent of 150 g/eq to 300 g/eq.

5. The curable resin composition according to claim 1, wherein the cationic polymerizable compound (B) has two to six cationic polymerization reactive groups.

6. The curable resin composition according to claim 1, wherein the particle (C) is contained at 2 parts by mass to 70 parts by mass, based on 100 parts by mass of the total mass of the oxetane compound (A) and the cationic polymerizable compound (B).

7. The curable resin composition according to claim 1, wherein the curing agent (D) is a photocationic polymerization initiator.

8. The curable resin composition according to claim 7, wherein the photocationic polymerization initiator is contained at 0.1 parts by mass to 15 parts by mass, based on 100 parts by mass of the total mass of the oxetane compound (A) and the cationic polymerizable compound (B).

9. The curable resin composition according to claim 1, further comprising 0 parts by mass to 80 parts by mass of a radical polymerizable compound, based on 100 parts by mass of the total mass of the oxetane compound (A) and the cationic polymerizable compound (B).

10. The curable resin composition according to claim 9, wherein the radical polymerizable compound is a (meth)acrylate compound.

11. The curable resin composition according to claim 9, wherein a radical polymerization initiator is contained at 0.1 parts by mass to 15 parts by mass, based on 100 parts by mass of the radical polymerizable compound.

12. A manufacturing method of a three-dimensional object by photocuring the curable resin composition according to claim 1, based on a slice data of a three-dimensional model, the method comprising:

forming a layer formed of the curable resin composition; and irradiating the layer formed of the curable resin composition with an active energy ray based on the slice data to cure the curable resin composition.

13. The manufacturing method according to claim 12, wherein the active energy ray is an ultraviolet ray of a wavelength of 300 nm to 450 nm.

14. The manufacturing method according to claim 12, wherein the active energy ray is concentrated in a dot shape and is used to scan, and the layer formed of the curable resin composition is irradiated with the active energy ray to cure the layer formed of the curable resin composition.

15. The manufacturing method according to claim 12, wherein the active energy ray is irradiated in a planar shape through a planar plotting mask to cure the layer formed of the curable resin composition.

16. A cured product of the curable resin composition according to claim 1, which has a Charpy impact strength of 5 $kJ/m^2$.

* * * * *